US006778660B2

(12) United States Patent
Fromm

(10) Patent No.: US 6,778,660 B2
(45) Date of Patent: Aug. 17, 2004

(54) CUSTOMER INTERACTION SYSTEM

(75) Inventor: Laurence J. Fromm, Weston, FL (US)

(73) Assignee: Concerto Software, Inc., Westford, MA (US)

( * ) Notice: Subject to any disclaimer, the term of this patent is extended or adjusted under 35 U.S.C. 154(b) by 683 days.

(21) Appl. No.: 09/827,848

(22) Filed: Apr. 6, 2001

(65) Prior Publication Data

US 2002/0146110 A1 Oct. 10, 2002

(51) Int. Cl.7 .......................... H04M 1/64; H04M 3/523
(52) U.S. Cl. .................... 379/265.02; 379/69; 379/84; 379/85; 379/88.26; 379/266.01
(58) Field of Search ................. 379/68, 69, 70, 379/84, 85, 88.22, 88.26, 265.01, 265.02, 265.09, 265.11, 265.12, 265.13, 266.01, 266.02, 266.03

(56) References Cited

U.S. PATENT DOCUMENTS

| 3,333,271 A | 7/1967 | Robinson et al. ............ 343/113 |
| 4,066,847 A | 1/1978 | Giordano ...................... 179/99 |
| 4,286,118 A | 8/1981 | Mehaffey et al. .......... 179/18 D |
| 4,356,348 A | 10/1982 | Smith ...................... 179/1 MN |
| 4,392,129 A | 7/1983 | Mehaffey et al. ............ 340/765 |
| 4,408,100 A | 10/1983 | Pritz et al. ................. 179/27 D |
| 4,477,698 A | 10/1984 | Szlam et al. ............ 179/90 BD |
| 4,494,229 A | 1/1985 | Jolissaint ...................... 370/58 |
| 4,510,351 A | 4/1985 | Costello et al. ............ 179/27 D |
| 4,540,855 A | 9/1985 | Szlam et al. ............... 179/84 R |
| 4,593,273 A | 6/1986 | Narcisse ...................... 340/539 |
| 4,599,493 A | 7/1986 | Cave ....................... 179/18 FH |
| 4,600,814 A | 7/1986 | Cunniff et al. ........... 179/18 BC |
| 4,677,663 A | 6/1987 | Szlam ......................... 379/211 |
| 4,692,858 A | 9/1987 | Redford et al. .............. 364/200 |
| 4,694,483 A | 9/1987 | Cheung ......................... 379/34 |
| 4,720,853 A | 1/1988 | Szlam ......................... 379/211 |
| 4,742,537 A | 5/1988 | Jesurum ...................... 379/351 |
| 4,742,538 A | 5/1988 | Szlam ......................... 379/361 |
| 4,742,539 A | 5/1988 | Szlam ......................... 379/377 |
| 4,757,267 A | 7/1988 | Riskin ......................... 379/113 |

(List continued on next page.)

FOREIGN PATENT DOCUMENTS

EP          0855826          7/1998          ............ H04M/3/50

OTHER PUBLICATIONS

M2 Presswire, 3COM: Cell IT launches breakthrough multimedia call center solution based on high speed 3Com systems; Mar. 4, 1998; 1–3 webpages; Coventry.
AT & T Technology; In The Forefront With Integrated Call Centers; Winter 1992; 1–7 webpages; New York.
Telemarketing & Call Center Solutions; How a Travel–Industry Call Center Excels; Sep. 1997; 1–2 webpages; Norwalk.

Primary Examiner—Harry S. Hong
(74) Attorney, Agent, or Firm—Bourque & Assoc., P.A.

(57) ABSTRACT

An improved contact center is disclosed in which voice contacts may be processed by agents simultaneously by storing incoming voice and responding to it in near real time. The technique permits an agent at a contact center to process incoming voice contacts in near real time, but to simultaneously handle plural customers in a manner similar to that utilized in web chat applications.

15 Claims, 2 Drawing Sheets

U.S. PATENT DOCUMENTS

| | | | | |
|---|---|---|---|---|
| 4,782,463 | A | 11/1988 | Sanders | 364/900 |
| 4,782,510 | A | 11/1988 | Szlam | 379/88 |
| 4,792,968 | A | 12/1988 | Katz | 379/92 |
| 4,797,911 | A | 1/1989 | Szlam et al. | 379/67 |
| 4,811,240 | A | 3/1989 | Ballou et al. | 364/518 |
| 4,829,563 | A | 5/1989 | Crockett et al. | 379/309 |
| 4,858,120 | A | 8/1989 | Samuelson | 364/401 |
| 4,866,638 | A | 9/1989 | Cosentino et al. | 364/521 |
| 4,881,261 | A | 11/1989 | Oliphant et al. | 379/215 |
| 4,894,857 | A | 1/1990 | Szlam et al. | 379/67 |
| 4,896,345 | A | 1/1990 | Thorne | 379/67 |
| 4,933,964 | A | 6/1990 | Girgis | 379/67 |
| 4,939,771 | A | 7/1990 | Brown et al. | 379/67 |
| 4,939,773 | A | 7/1990 | Katz | 379/204 |
| 4,988,209 | A | 1/1991 | Davidson et al. | 370/58 |
| 5,021,976 | A | 6/1991 | Wexelblat et al. | 364/521 |
| 5,041,992 | A | 8/1991 | Cunningham et al. | 364/518 |
| 5,062,103 | A | 10/1991 | Davidson et al. | 370/58.1 |
| 5,070,525 | A | 12/1991 | Szlam et al. | 379/196 |
| 5,115,501 | A | 5/1992 | Kerr | 395/600 |
| 5,119,072 | A | 6/1992 | Hemingway | 340/573 |
| 5,119,475 | A | 6/1992 | Smith et al. | 395/156 |
| 5,121,477 | A | 6/1992 | Koopmans et al. | 395/156 |
| 5,175,761 | A | 12/1992 | Khalid et al. | 379/89 |
| 5,179,657 | A | 1/1993 | Dykstal et al. | 395/161 |
| 5,179,700 | A | 1/1993 | Aihara et al. | 395/650 |
| 5,181,236 | A | 1/1993 | LaVallee et al. | 379/67 |
| 5,206,903 | A | 4/1993 | Kohler et al. | 379/309 |
| 5,214,688 | A | 5/1993 | Szlam et al. | 379/67 |
| 5,276,731 | A | 1/1994 | Arbel et al. | 379/88 |
| 5,309,505 | A | 5/1994 | Szlam et al. | 379/88 |
| 5,309,513 | A | 5/1994 | Rose | 379/265 |
| 5,335,269 | A | 8/1994 | Steinlicht | 379/266 |
| 5,345,589 | A | 9/1994 | King et al. | 395/650 |
| 5,357,254 | A | 10/1994 | Kah | 342/42 |
| 5,386,412 | A | 1/1995 | Park et al. | 370/53 |
| 5,428,827 | A | 6/1995 | Kaaser | 455/161.3 |
| 5,430,792 | A | 7/1995 | Jesurum et al. | 379/67 |
| 5,440,616 | A | 8/1995 | Harrington et al. | 379/88 |
| 5,490,211 | A | 2/1996 | Adams | 379/265 |
| 5,500,891 | A | 3/1996 | Harrington et al. | 379/265 |
| 5,511,112 | A | 4/1996 | Szlam | 379/88 |
| 5,511,117 | A | 4/1996 | Zazzera | 379/265 |
| 5,519,773 | A | 5/1996 | Dumas et al. | 379/265 |
| 5,533,103 | A * | 7/1996 | Peavey et al. | 379/69 |
| 5,533,109 | A | 7/1996 | Baker | 379/201 |
| 5,535,270 | A | 7/1996 | Doremus et al. | 379/266 |
| 5,546,456 | A | 8/1996 | Vilsoet et al. | 379/265 |
| 5,553,133 | A | 9/1996 | Perkins | 379/265 |
| 5,568,544 | A | 10/1996 | Keeler et al. | 379/273 |
| 5,579,368 | A | 11/1996 | Berkum | 379/15 |
| 5,581,602 | A | 12/1996 | Szlam | 379/67 |
| 5,586,178 | A | 12/1996 | Koenig | 379/265 |
| 5,588,045 | A | 12/1996 | Locke | 379/67 |
| 5,594,781 | A | 1/1997 | Kozdon et al. | 379/60 |
| 5,594,791 | A | 1/1997 | Szlam et al. | 379/265 |
| 5,619,557 | A | 4/1997 | Berkum | 379/88 |
| 5,623,540 | A | 4/1997 | Morrison et al. | 379/115 |
| 5,675,637 | A | 10/1997 | Szlam et al. | 379/142 |
| 5,689,240 | A | 11/1997 | Traxler | 340/573 |
| 5,696,818 | A | 12/1997 | Doremus et al. | 379/265 |
| 5,714,932 | A | 2/1998 | Castellon et al. | 340/539 |
| 5,715,307 | A | 2/1998 | Zazzera | 379/265 |
| 5,722,059 | A | 2/1998 | Campana | 455/226.2 |
| 5,722,064 | A | 2/1998 | Campana | 455/351 |
| 5,729,600 | A | 3/1998 | Blaha | 379/265 |
| 5,742,233 | A | 4/1998 | Hoffman et al. | 340/573 |
| 5,815,565 | A | 9/1998 | Doremus et al. | 379/265 |
| 5,825,283 | A | 10/1998 | Camhl | 340/438 |
| 5,825,869 | A | 10/1998 | Brooks et al. | 379/265 |
| 5,828,731 | A | 10/1998 | Szlam | 379/88 |
| 5,832,059 | A | 11/1998 | Aldred et al. | 379/34 |
| 5,832,070 | A | 11/1998 | Bloom et al. | 379/265 |
| 5,857,014 | A | 1/1999 | Sumner et al. | 379/93.02 |
| 5,864,615 | A | 1/1999 | Dezonno | 379/265 |
| 5,940,494 | A | 8/1999 | Rafacz | 379/265 |
| 5,963,635 | A | 10/1999 | Szlam et al. | 379/309 |
| RE36,416 | E | 11/1999 | Szlam et al. | 379/88.09 |
| 5,991,394 | A | 11/1999 | Dezonno et al. | 379/265 |
| 6,044,146 | A | 3/2000 | Gisby et al. | 379/265 |
| 6,044,355 | A | 3/2000 | Crockett et al. | 705/8 |
| 6,118,763 | A | 9/2000 | Trumbull | 370/231 |
| 6,134,530 | A | 10/2000 | Bunting et al. | 705/7 |
| 6,157,655 | A | 12/2000 | Shtivelman | 370/412 |
| 6,269,153 | B1 | 7/2001 | Carpenter | 379/88.02 |
| 6,272,347 | B1 | 8/2001 | Griffith et al. | 455/445 |
| 6,314,089 | B1 | 11/2001 | Szlam et al. | 370/270 |
| 6,359,892 | B1 | 3/2002 | Szlam | 370/401 |
| 6,359,982 | B1 | 3/2002 | Foster et al. | 379/266.06 |
| 6,362,838 | B1 | 3/2002 | Szlam et al. | 345/762 |
| 6,570,980 | B1 * | 5/2003 | Baruch | 379/265.12 |
| 6,665,395 | B1 * | 12/2003 | Busey et al. | 379/265.09 |
| 2002/0047859 | A1 | 4/2002 | Szlam et al. | 345/705 |
| 2002/0067822 | A1 | 6/2002 | Cohen et al. | 379/265.12 |
| 2002/0143878 | A1 | 10/2002 | Birnbaum et al. | 709/205 |
| 2002/0145624 | A1 | 10/2002 | Szlam et al. | 345/738 |
| 2002/0161896 | A1 | 10/2002 | Wen et al. | 709/227 |
| 2002/0196926 | A1 * | 12/2002 | Johnson et al. | 379/265.03 |

\* cited by examiner

CUSTOMER INTERACTION SYSTEM

TECHNICAL FIELD

The present invention relates to customer interaction systems, and more specifically, to an improved method and apparatus for use in a contact center. The technique enables agents to handle multiple voice calls simultaneously in a manner similar to the way in which agents can handle "text chat" calls simultaneously.

BACKGROUND OF THE INVENTION

Today's modern call centers often include multiple channels of communication between customers or potential customers and agents employed by the contact center itself. Such contact centers are usually utilized by large companies serving large numbers of customers. Examples include credit card companies, airlines, etc.

Typically, "contacts" arrive from customers seeking answers to questions, changes in their accounts, instructions on how to proceed with certain transactions, etc. When such contacts arrive, they are routed to an appropriate agent for processing.

The interaction between customer and agent may take a variety of forms. The most common contact is voice over a conventional public switched telephone network (PSTN). For example, a customer may call a toll free number designated by a credit card company in order to inquire regarding the status of the customer's account.

Recently however, contacts may occur between agents and customers utilizing other types of interactions. For example, customers may engage in "web chat" wherein customers exchange typed messages with an agent on a semi-real time (i.e. near real time) basis. This type of exchange facilitates near real time communication between agent and consumer without a telephone call.

One advantage of web chat communications over voice communications is the fact that an agent can service multiple customers simultaneously. More specifically, the agents "bandwidth" does not have to be dedicated to a single customer contact. Instead, the agent can service plural customer contacts substantially simultaneously. After the agent types out or transmits a reply to one customer, he or she can then accept another question or reply to another customer. Moreover, the information transmitted to a customer could direct that customer to a different website or other contact center for a solution to the customer's issue.

The exchange of information between customer and agent in a web chat environment is thus more efficient than in a voice communication mode. More specifically, the real time voice communication mode involves full dedication of an agent to a single customer for the duration of the interaction. Web chat, on the other hand, allows a single agent to multiplex his or her time to service plural customer interactions. Although the web chat interaction may not be in real time, it is close to real time.

In view of the above, it can be appreciated that the prior art lacks a system for implementing near real time communications among an agent and plural customers when the interaction is not a web chat, but instead is a phone call.

SUMMARY OF THE INVENTION

The above and other problems of the prior art are overcome in accordance with the present invention, which relates to a method and apparatus for achieving the advantages of web chat communications in voice sessions. In accordance with the invention, an arriving contact in the form of a voice call is processed to determine which agent should be assigned the call. If possible, the call is routed to the agent. If the agent is busy on another call, a prerecorded message asks the user to state his question. The agent may then process and respond to messages recorded in one or more queues, in a similar manner to that utilized in web chat interactions in order to provide near real time communications with plural customers. Once the agent responds to a first voice recording, the next recording can be listened to. The system results in somewhat less than real time communication, but the voice communication is almost in real time.

In preferred embodiments, the voice contacts are queued in an appropriate order so that the agent may select or respond as appropriate. Additionally, the system may provide for playback at slightly faster than real time, permitting an agent to "catch up" while listening to a recorded message.

In accordance with the foregoing, the responses from the agent(s) to the customers are transmitted substantially in real time, while the incoming audio signals from the customers are transmitted in slightly less than real time. As a result, a single agent may respond to plural customers orally while the communications session between the customers and the agent remain "active" or "open".

DETAILED DESCRIPTION OF THE PREFERRED EMBODIMENTS

Figure 1:
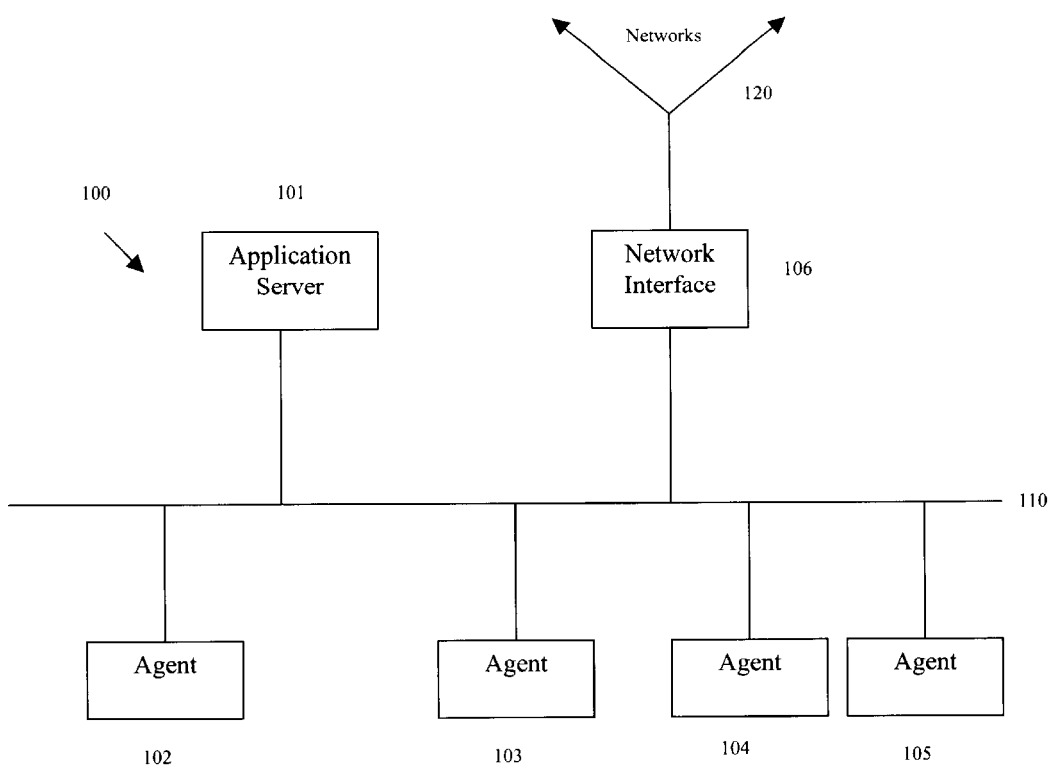
FIG. 1 is a block diagram of an exemplary network which may be implemented in a call center.

FIG. 1 depicts an exemplary architecture for use in a contact center for processing plural contacts. The arrangement of FIG. 1 includes a contact center 100 populated with plural exemplary agent stations 102–105, a network interface 106, application server 101, and a local area network (LAN) 110 for facilitating communications between the numerous components thereof.

Notably, in any actual contact center utilizing present state of the art technology, the LAN 110 may have other items connected to it, such as plural database servers, numerous agent stations and supervisory stations, switching mechanisms, etc. The particular configuration of the contact center is not critical to the present invention, however, the use of application server 101 is included in the preferred embodiment to provide information regarding which particular agent to route contacts to, as described in more detail below.

In operation, contacts arrive at network interface 106 from remotely located customers via networks 120. Networks 120 may include the PSTN, a wide area network such as the Internet, or any other of a variety of communications networks.

Network interface 106 would include capability for switching arriving contacts to a selected agent 102–105 via LAN 110. Notably, the routing decision as to which of agents 102–105 to which a particular incoming contact should be routed, may be made by network interface 106, and independent application server 101, or some combination thereof. One technique for determining to which agent a contact should be routed is disclosed in U.S. patent application Ser. No. 09/435,233, the entire disclosure of which is hereby incorporated by reference. In the Ser. No. 09/435,233 application, incoming contacts are processed by ascertaining which particular agents possess the skills most closely matched to those required by the incoming contact, and the call is routed appropriately.

In accordance with one aspect of the present invention, if the agent is presently busy, the system may permit a user to begin speaking anyway and the agent will respond by voice as soon as the agent becomes available. Accordingly, rather than simply be placed on hold, the user may begin speaking immediately. If the agent becomes available to process the call during the time that the customer is speaking, then the system begins playback of the previously recorded voice while continuing to record the remaining user voice.

Optionally, the playback can be slightly faster than real time so that the listening agent will "catch up" to the customer's incoming speech.

In another embodiment, the system may permit a user to set as a parameter that determines whether a contact to be routed to an agent that is unavailable gets routed to the next most preferable agent, or whether the recording methodology described above is utilized instead, so that only the preferred agent gets to process the contact. As a result of allowing such a selection, one of at least two techniques may be used to process the contact. If the parameter is set in a first way, then a contact to be routed to an unavailable agent results in the contact being processed in slightly less than real time, since the agent must become available before he or she can respond to the customer's voice communication. If the parameter is set another way, then the contact will be routed to the next most preferable agent if the first choice is unavailable.

Figure 2:
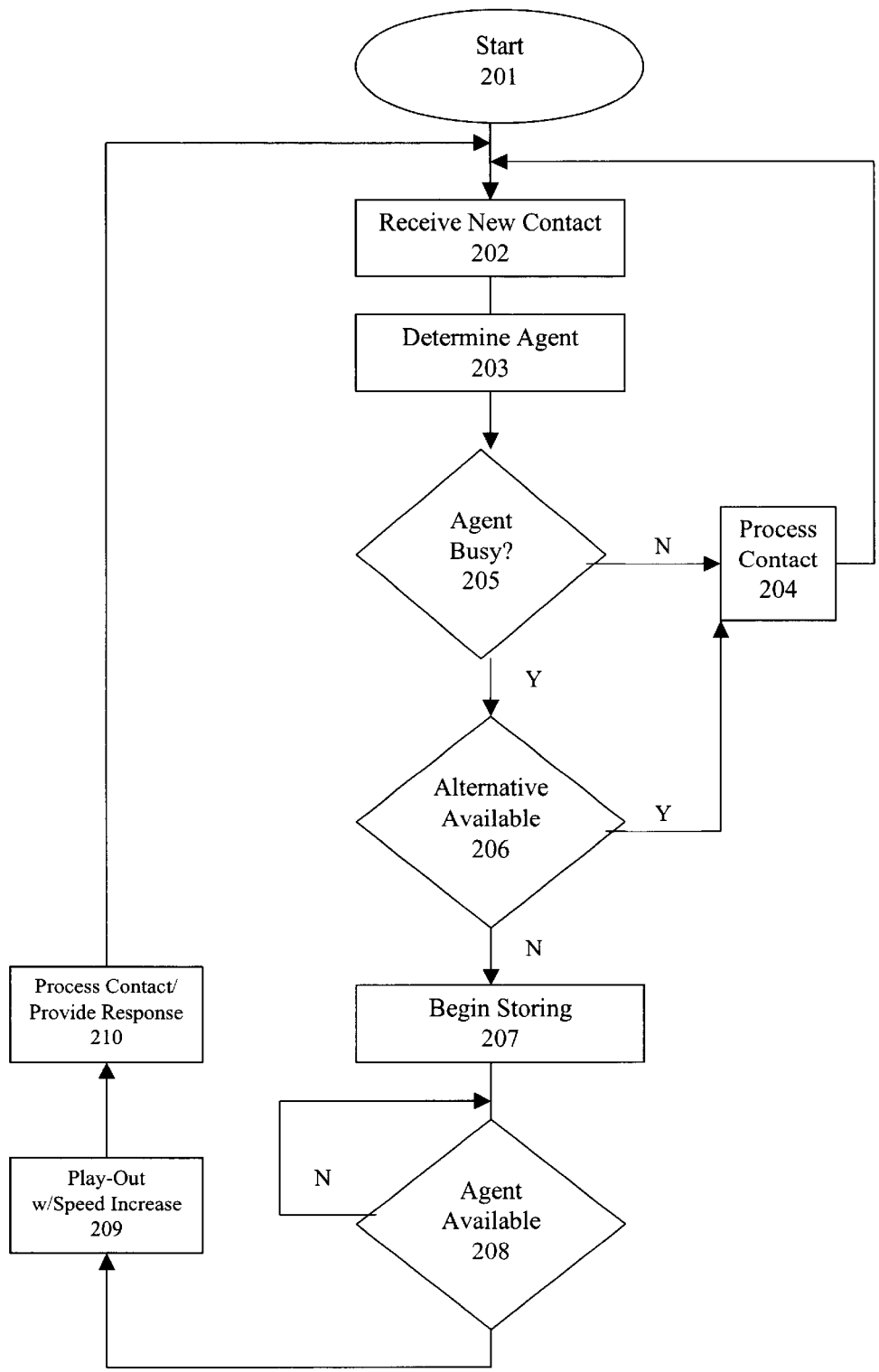
FIG. 2 shows a conceptual flow chart of the steps necessary to process incoming contacts in accordance with the present invention.

FIG. 2 shows a conceptual flow chart of the processing of incoming contacts in accordance with one exemplary embodiment of the present invention. Each element of FIG. 2 may be implemented in hardware and/or software, using a variety of techniques well known to those of skill in the art.

The arrangement of FIG. 2 represents the basic steps through which the contact center would proceed as a contact is received and processed. After start 201, the new contact is received at block 202 by network interface 106. Control is transferred to block 203 for the purpose of ascertaining to which agent the contact should be sent. The steps executed by block 203 may involve contacting a particular application server 101 in order to ascertain which of agents 102–105 should process the contact. In a preferred embodiment, the application server 101 may return an ordered list specifying plural choices for a particular agent. Such an ordered list may be arrived at by utilizing the techniques described in co-pending U.S. patent application Ser. No. 09/435,233, or may be assigned by simply matching the incoming call to any available agent that possesses a skill set required to process the call. Other alternatives include simply assigning incoming contacts on a "round robin" basis to an available agent. The particular technique utilized to select the particular agent that should handle the incoming contact is not critical to the present invention.

After determination is made as to which of agents 102–105 will handle the contact, the network interface 106 and/or applications server 101 attempts to transfer the call to that agent as indicated by decision point 205 of FIG. 2. If the agent is available, the contact will be processed by facilitating audio communication between agent and customer at block 204. Notably, the audio communication may be facilitated via real time communications, or may utilize the teachings described below wherein such communications takes place by first storing incoming and outgoing audio signals.

Returning to decision point 205, if the selected agent is not available, control is transferred to decision point 206 to determine if an alternate agent is available. An alternate agent may be unavailable due to one of at least two reasons. First, the contact or application software may be such that only the selected agent may be utilized to service the contact. This could be due to the fact that the user selected parameters in configuring the software such that only the selected agent may process the contact. Alternatively, an alternative agent may be feasible but may himself or herself be unavailable due to other contacts being processed by the agent.

It can therefore be appreciated that if the flow chart of FIG. 2 reaches path 221, no agent is presently available to begin handling the call. Accordingly, the system begins storing an incoming audio stream from the user. Block 207 may begin by announcing a greeting message such as "We are about to become available to answer your question. Please begin speaking by stating your question and an agent will pick up shortly." The user will then begin speaking just as if he or she were communicating directly with an agent. However, the incoming audio will be digitized and stored. While storing the audio, decision point 208 continuously monitors the status of agents that may be able to handle the incoming contact. If, such an agent becomes available, then the call can be sent to the agent by transferring the stored audio to the agent's station.

At that time, the agent begins hearing the playing out of the stored audio signal at block 209. Preferably, the output audio signal is slightly faster than real time. This helps eliminate the delay introduced by the storing of the audio signal at block 207. Additionally, in situations wherein the agent becomes available during storing of the audio signal, the playing out at block 209 at slightly faster than real time may permit the play-out to "catch up" to the incoming audio signal. More specifically, the play-out system may play out all of the stored audio while the customer that called is still speaking. In such a case, the system would, upon reaching the end of the stored audio, promptly switch the audio path so that the play-out switches from the stored portion to the real time incoming portion. The foregoing provides that during faster than real time playout of the recorded audio, other incoming audio is being recorded, but during the real time receipt of the incoming audio stream after the system "catches up", no other portions of the incoming audio get recorded.

If such a faster than real time playout is employed, then the system should utilize a frequency compensation technique so that the playout does not sound high pitched due to the increased speed. Such frequency compensation systems are known in the art and are commercially available form numerous sources.

In either event, once an audio signal is played out to the now available agent, the contact may be processed at block 210 before the flow chart returns to receive a new contact. The new contact may be received and processed from another audio storage location that invoked block 207 to store the audio, in a similar fashion to that previously described. Alternatively, the new contact may possibly arrive via a real time voice incoming call processed without storage of any kind.

In accordance with the above, numerous audio communications sessions may remain concurrently open, each session being between a particular agent and a particular customer. The agent's response would typically be conveyed in near real time or in real time, whereas the incoming audio signals from each customer would be temporarily stored before being routed to an agent. In any event, during the plural communications sessions, the responses from the agents would be stored for a shorter duration of time then that for the incoming audio signals from the customers. This is because the incoming audio signal is stored until the agent becomes available, whereas the outgoing response from the agent is transmitted from the contact center substantially in real time.

It is also noted that the agent may choose a particular order in which it is desired to process the contacts from the stored queues. For example, simple round robin may be utilized, or the contacts may be prioritized based upon number dialed, account numbers, or any other characteristic.

The above describes only the preferred embodiment of the invention, and various other modifications and additions will be apparent to those of ordinary skill in the art. For example, the incoming audio signal may arrive via a standard telephone call, or via a data network such as voice over the Internet. The invention is not limited to the above embodiments, and is limited only by the claims appended hereto.

What is claimed:

1. A contact center for servicing contacts from users, the contact center comprising a plurality of agents terminals, each agent terminal being associated with an agent, the contact center comprising:
   a network interface for receiving a contact from a user and for routing said contact to an agent for processing;
   a storage device for storing audio input by said user if said agent is unavailable to process said call;
   a monitoring and playout device for monitoring the contact, and for playing out the stored audio immediately upon said agent becoming available, whether or not said user has completed storing said audio.

2. The contact center of claim 1 wherein said monitoring a playout device plays out recorded audio at faster than real time.

3. The contact center of claim 2 wherein said monitoring and playout device includes a frequency maintaining played out audio at a correct frequency when said playout occurs in faster than real time.

4. The contact center of claim 3 configured such that if said agent becomes available during the time said audio signal is being stored, said monitoring and playout device plays out said stored audio in faster than real time while continuing to store incoming audio, and when said stored audio is fully played out, said monitoring and playout device switches over such that said actual incoming audio is delivered to said agent instead of said stored audio.

5. A method of processing plural audio signals at a contact center, each audio signal corresponding to that received from a separate contact, the method comprising the steps of:
   Receiving the audio signals from the users as they are submitted;
   Storing the incoming audio signals from said contacts in memory;
   Routing said incoming audio to agents from memory while said users are still connected to said contact center by transmitting said audio signals from said memory to one or more agents in faster than real time for portions first stored in memory until said memory is fully emptied, and in real time for portions of audio signals thereafter.

6. The method of claim 5 further comprising responding to the audio signal from one of said contacts, and then processing other ones of said contacts from a stored audio signal.

7. The method of claim 6 further comprising setting a parameter in advance of said contact being received, the parameter being determinative of whether a contact that arrives and that is to be processed by a selected agent is to be processed by a different agent if said selected agent is unavailable, or should be processed by storing an incoming audio signal if said selected agent is unavailable.

8. A method of processing voice calls by an agent at a contact center, the method comprising the steps of storing plural incoming audio signals, one from each of plural customers, and responding to each of the customers orally, the response going in real time, the incoming audio signals not being conveyed in real time, the responses going while communications sessions between the customers and the agent remains open.

9. The method of claim 8 wherein said incoming audio signals are conveyed to said agent partially in real time and partially in slower than real time.

10. Apparatus for connecting users with agents in a contact center, said apparatus comprising a application server for analyzing incoming voice contacts and determining an ordered list of possible agents to process said incoming voice contact;
   A network interface for routing said contact to the first agent on said list and if said first contact is unavailable, either storing said incoming voice contact or routing it to a different agent, depending upon a parameter set in advance by a user.

11. The apparatus of claim 10 wherein an agent sequentially responds to plural incoming contacts while communications sessions between each of the users corresponding to the contacts remain active.

12. Apparatus for use in a contact center comprising means for establishing near real time communications sessions between said contact center and plural users, means for storing plural incoming voice signals from different users, means for playing out said stored voice signals in an order selected by an agent to interact with said users, and means for conveying an audio signal back to said users in real time while said communications sessions remain active.

13. The apparatus of claim 12 wherein said incoming voice signals are played to said agent in faster than real time.

14. The apparatus of claim 13 wherein parts of said incoming voice signals are played to said agent in real time, and parts of said audio signals are played to said agent in faster than real time.

15. The method of claim 14 wherein said parts of said audio signal played in faster than real time are so played while portions of said audio signals are being recorded, and said parts of said audio signal played in real time are played while no other portion of said audio signal is being recorded.

* * * * *